United States Patent
Jalilian et al.

(10) Patent No.: US 12,253,204 B2
(45) Date of Patent: Mar. 18, 2025

(54) METHODS AND SYSTEMS FOR TRACKING AN OBJECT MOVING ALONG A CONDUIT

(71) Applicant: HIFI ENGINEERING INC., Calgary (CA)

(72) Inventors: Seyed Ehsan Jalilian, Calgary (CA); Mehri Owjimehr, Calgary (CA)

(73) Assignee: HIFI ENGINEERING INC, Calgary (CA)

( * ) Notice: Subject to any disclaimer, the term of this patent is extended or adjusted under 35 U.S.C. 154(b) by 187 days.

(21) Appl. No.: 18/054,496

(22) Filed: Nov. 10, 2022

(65) Prior Publication Data

US 2024/0011594 A1    Jan. 11, 2024

Related U.S. Application Data

(60) Provisional application No. 63/359,128, filed on Jul. 7, 2022.

(51) Int. Cl.
*F16L 55/48*    (2006.01)
*G01H 9/00*    (2006.01)
*G01S 11/14*    (2006.01)

(52) U.S. Cl.
CPC .............. *F16L 55/48* (2013.01); *G01H 9/004* (2013.01); *G01S 11/14* (2013.01)

(58) Field of Classification Search
CPC ........... F16L 55/48; G01H 9/004; G01S 11/14
See application file for complete search history.

(56) References Cited

U.S. PATENT DOCUMENTS

| | | | | |
|---|---|---|---|---|
| 10,132,823 | B2* | 11/2018 | Giunta | G01M 3/246 |
| 2012/0230629 | A1 | 9/2012 | Hill et al. | |
| 2014/0123759 | A1* | 5/2014 | Minto | F17D 5/005 73/592 |
| 2019/0196578 | A1* | 6/2019 | Lodice | G01S 15/66 |
| 2019/0200961 | A1* | 7/2019 | Specht | A61B 8/5223 |
| 2020/0370949 | A1* | 11/2020 | Ip | H04B 10/071 |
| 2024/0011594 | A1* | 1/2024 | Jalilian | G01H 9/004 |

FOREIGN PATENT DOCUMENTS

| | | | | | |
|---|---|---|---|---|---|
| CA | | 3180873 A1 * | 1/2024 | ............. | F16L 55/48 |
| CN | | 106054135 A | 10/2016 | | |
| WO | | 2013102252 A1 | 7/2013 | | |
| WO | WO-2024007067 A1 * | | 1/2024 | ............. | F16L 55/48 |

* cited by examiner

*Primary Examiner* — Daniel Pihulic
(74) *Attorney, Agent, or Firm* — D'Ambrosio & Menon, PLLC; Usha Menon

(57) ABSTRACT

An object moving along a conduit having multiple channels is tracked. Each channel defines a portion of a length of the conduit. For each channel, acoustic data, generated from one or more acoustic signals detected at the channel in response to movement of the object along the conduit, is generated. For at least one channel, the acoustic data obtained for the at least one channel is cross-correlated with the acoustic data obtained for at least one other one of the channels. Based on the cross-correlating, a position of the object within the conduit is determined.

15 Claims, 18 Drawing Sheets

METHODS AND SYSTEMS FOR TRACKING AN OBJECT MOVING ALONG A CONDUIT

CROSS REFERENCE TO RELATED APPLICATION(S)

This application is related to and claims priority to U.S. Provisional Patent Application No. 63/359,128 filed on Jul. 7, 2022, the contents of which are incorporated by reference herein.

FIELD

The present disclosure relates to methods and systems for object tracking, such as tracking a pipeline inspection gauge moving along a pipeline.

BACKGROUND

Pipeline inspection gauges (PIGs) are devices used for the maintenance of pipelines. A PIG is introduced into a pipeline using a suitable launcher, and the PIG is then transported along the pipeline under pressure from the flow of fluid within the pipeline. PIGs may be used, for example, for cleaning the interior surface of the pipeline or for inspecting the pipeline to collect data on wall thickness, signs of corrosion, etc.

One problem with PIGs is that it can be difficult to determine the location of the PIG within the pipeline at any given moment. As a result, it can be difficult to determine when the PIG will exit the pipeline. In addition, PIGs can occasionally become stuck in the pipeline, and it can be difficult to remove the PIG without first knowing where in the pipeline the PIG is stuck.

SUMMARY

According to a first aspect of the disclosure, there is provided a method of tracking an object moving along a conduit having multiple channels, each channel defining a portion of a length of the conduit, the method comprising: for each channel: obtaining acoustic data generated from one or more acoustic signals detected at the channel in response to movement of the object along the conduit; for at least one channel: cross-correlating the acoustic data obtained for the at least one channel with the acoustic data obtained for at least one other one of the channels; and determining, based on the cross-correlating, a position of the object within the conduit.

The cross-correlating may comprise: for each channel: cross-correlating the acoustic data obtained for the channel with the acoustic data obtained for each other one of the channels; and the determining may comprise: determining, based on each cross-correlation, the position of the object within the conduit.

Obtaining the acoustic data may comprise: detecting the one or more acoustic signals using one or more sensors; and generating the acoustic data from the one or more detected acoustic signals.

Detecting the one or more acoustic signals may comprise: optically interrogating one or more lengths of optical fiber positioned alongside the conduit.

The one or more lengths of optical fiber may comprise one or more fiber Bragg grating for reflecting light transmitted along the one or more lengths of optical fiber.

Determining the position of the object may comprise: generating a cross-correlation map by mapping each cross-correlation as a function of the channels; and determining, based on the cross-correlation map, the position of the object.

Generating the cross-correlation map may comprise: for each cross-correlation: determining a lag of the cross-correlation; and generating the cross-correlation map by further mapping each cross-correlation as a function of each determined lag.

Determining the position of the object may further comprise: for each cross-correlation in the cross-correlation map: determining an absolute value of the cross-correlation; determining a maximum cross-correlation based on each absolute value of each cross-correlation; and determining the position of the object based on the maximum cross-correlation.

Determining the position of the object may further comprise: determining a channel associated with the maximum cross-correlation; and determining the position of the object based on the channel associated with the maximum cross-correlation.

Determining the position of the object may comprise: identifying in the cross-correlation map an apex formed by an intersection of lines defined by the mapped cross-correlations; determining a channel associated with the apex; and determining the position of the object based the apex.

The acoustic data may comprise data in a frequency range of from 0 to 100 kHz.

Obtaining the acoustic data may comprise: obtaining raw acoustic data generated from the one or more acoustic signals detected at the channel in response to movement of the object along the conduit; and down-sampling the raw acoustic data so as to obtain the acoustic data.

The object may be a pipeline inspection gauge.

Cross-correlating the acoustic data obtained for the at least one channel with the acoustic data obtained for the at least one other one of the channels may comprise performing the cross-correlation over a time window, and wherein the time window is at least as long as an amount of time taken for the one or more acoustic signals to travel from the at least one channel to the at least one other one of the channels.

According to a further aspect of the disclosure, there is provided a system comprising: a conduit having multiple channels, each channel defining a portion of a length of the conduit; one or more sensors positioned to monitor the conduit; and one or more controllers configured to: for each channel: operate the one or more sensors so as to detect one or more acoustic signals at the channel in response to movement of the object along the conduit; generate acoustic data from the one or more detected acoustic signals; and for at least one channel: cross-correlate the acoustic data obtained for the at least one channel with the acoustic data obtained for at least one other one of the channels; and determine, based on the cross-correlation, a position of the object within the conduit.

The one or more sensors may comprise one or more lengths of optical fiber positioned alongside the conduit; the system may further comprise an optical fiber interrogator optically coupled to the one or more lengths of optical fiber; and the one or more controllers may be further configured to control the optical fiber interrogator so as to interrogate the one or more lengths of optical fiber.

According to a further aspect of the disclosure, there is provided a computer-readable medium having stored thereon computer program code configured, when executed by one or more processors, to cause the one or more processors to perform a method comprising: for each channel of a conduit, each channel defining a portion of a length of the conduit: receiving acoustic data generated from one or more acoustic signals detected at the channel in response to movement of an object along the conduit; and for at least one channel: cross-correlating the acoustic data received for the at least one channel with the acoustic data received for at least one other one of the channels; and determining, based on the cross-correlation, a position of the object within the conduit.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

Embodiments of the disclosure will now be described in detail in conjunction with the accompanying drawings of which.

DETAILED DESCRIPTION

The present disclosure seeks to provide improved methods and systems for tracking an object moving along a conduit. While various embodiments of the disclosure are described below, the disclosure is not limited to these embodiments, and variations of these embodiments may well fall within the scope of the disclosure which is to be limited only by the appended claims.

Fiber optic cables are often used as distributed measurement systems in acoustic sensing applications. Pressure changes, due to sound waves for example, in the space immediately surrounding an optical fiber and that encounter the optical fiber cause dynamic strain in the optical fiber. Optical interferometry may be used to detect the dynamic strain along a segment of the fiber. Optical interferometry is a technique in which two separate light pulses, a sensing pulse and a reference pulse, are generated and interfere with each other. The sensing and reference pulses may, for example, be directed along an optical fiber that comprises fiber Bragg gratings. The fiber Bragg gratings partially reflect the pulses back towards an optical receiver at which an interference pattern is observed.

The nature of the interference pattern observed at the optical receiver provides information on the optical path length the pulses traveled, which in turn provides information on parameters such as the strain experienced by the segment of optical fiber between the fiber Bragg gratings. Information on the strain then provides information about the event that caused the strain.

Figure 1A:
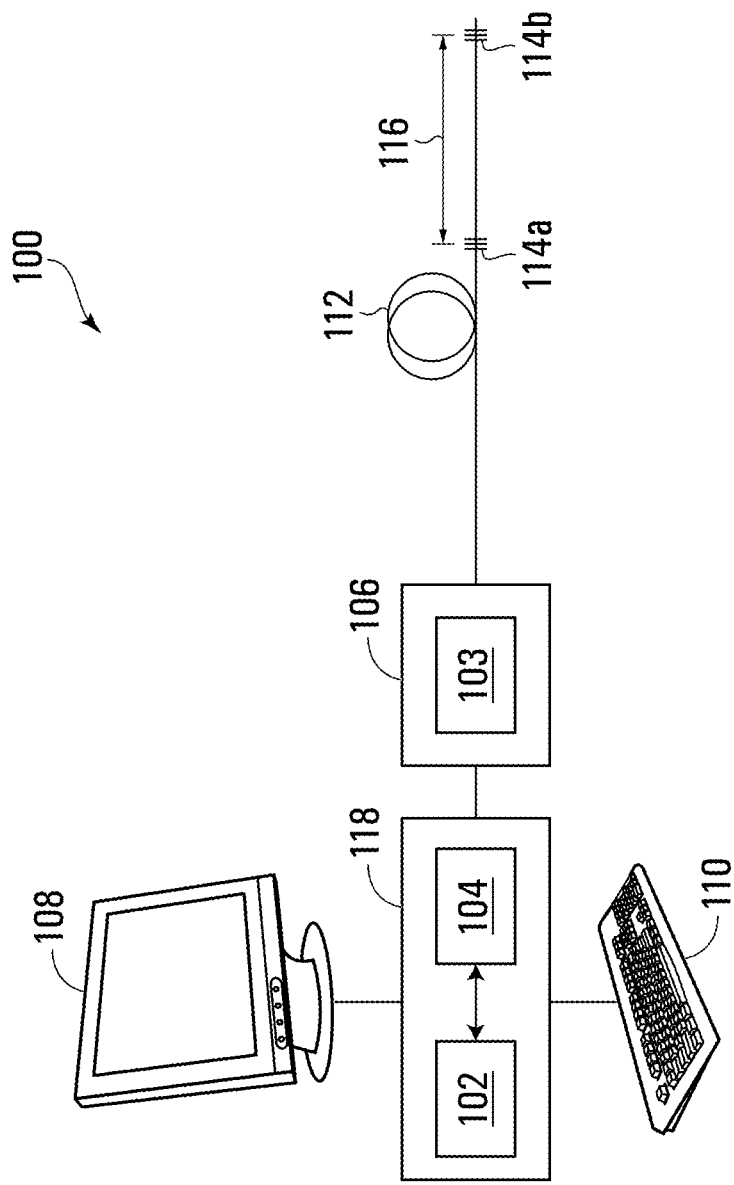
FIG. 1A is a block diagram of an optical interrogation system including an optical fiber with fiber Bragg gratings ("FBGs") for reflecting a light pulse, in accordance with embodiments of the disclosure.

Referring now to FIG. 1A, there is shown one embodiment of a system 100 for performing interferometry using fiber Bragg gratings ("FBGs"), in accordance with embodiments of the disclosure. The system 100 comprises optical fiber 112, an interrogator 106 optically coupled to the optical fiber 112, and a signal processing device 118 that is communicative with the interrogator 106.

The optical fiber 112 comprises one or more fiber optic strands, each of which is made from quartz glass (amorphous SiO2). The fiber optic strands are doped with various elements and compounds (including germanium, erbium oxides, and others) to alter their refractive indices, although in alternative embodiments the fiber optic strands may not be doped. Single mode and multimode optical strands of fiber are commercially available from, for example, Corning® Optical Fiber. Example optical fibers include ClearCurve™ fibers (bend insensitive), SMF28 series single mode fibers such as SMF-28 ULL fibers or SMF-28e fibers, and InfmiCor® series multimode fibers.

The interrogator 106 generates the sensing and reference pulses and outputs the reference pulse after the sensing pulse. The pulses are transmitted along optical fiber 112 that comprises a first pair of FBGs. The first pair of FBGs comprises first and second FBGs 114a,b (generally, "FBGs 114"). The first and second FBGs 114a,b are separated by a certain segment 116 of the optical fiber 112 ("fiber segment 116"). The optical length of the fiber segment 116 varies in response to dynamic strain that the fiber segment 116 experiences.

The light pulses have a wavelength identical or very close to the center wavelength of the FBGs 114, which is the wavelength of light the FBGs 114 are designed to partially reflect; for example, typical FBGs 114 are tuned to reflect light in the 1,000 to 2,000 nm wavelength range. The sensing and reference pulses are accordingly each partially reflected by the FBGs 114a,b and return to the interrogator 106. The delay between transmission of the sensing and reference pulses is such that the reference pulse that reflects off the first FBG 114a (hereinafter the "reflected reference pulse") arrives at the optical receiver 103 simultaneously with the sensing pulse that reflects off the second FBG 114b (hereinafter the "reflected sensing pulse"), which permits optical interference to occur.

While FIG. 1A shows only the one pair of FBGs 114a,b, in alternative embodiments (not depicted) any number of FBGs 114 may be on the fiber 112, and time division multiplexing (TDM) (and, optionally, wavelength division multiplexing (WDM)) may be used to simultaneously obtain measurements from them. If two or more pairs of FBGs 114 are used, any one of the pairs may be tuned to reflect a different center wavelength than any other of the pairs. Alternatively, a group of multiple FBGs 114 may be tuned to reflect a different center wavelength to another group of multiple FBGs 114, and there may be any number of groups of multiple FBGs extending along the optical fiber 112 with each group of FBGs 114 tuned to reflect a different center wavelength. In these example embodiments where different pairs or group of FBGs 114 are tuned to reflect different center wavelengths to other pairs or groups of FBGs 114, WDM may be used in order to transmit and to receive light from the different pairs or groups of FBGs 114, effectively extending the number of FBG pairs or groups that can be used in series along the optical fiber 112 by reducing the effect of optical loss that otherwise would have resulted from light reflecting from the FBGs 114 located on the fiber 112 nearer to the interrogator 106. When different pairs of the FBGs 114 are not tuned to different center wavelengths, TDM is sufficient.

The interrogator 106 emits laser light with a wavelength selected to be identical or sufficiently near the center wavelength of the FBGs 114, and each of the FBGs 114 partially reflects the light back towards the interrogator 106. The timing of the successively transmitted light pulses is such that the light pulses reflected by the first and second FBGs 114a,b interfere with each other at the interrogator 106, which records the resulting interference signal. The strain that the fiber segment 116 experiences alters the optical path length between the two FBGs 114 and thus causes a phase difference to arise between the two interfering pulses. The resultant optical power at the optical receiver 103 can be used to determine this phase difference. Consequently, the interference signal that the interrogator 106 receives varies with the strain the fiber segment 116 is experiencing, which allows the interrogator 106 to estimate the strain the fiber segment 116 experiences from the received optical power. The interrogator 106 digitizes the phase difference ("output signal") whose magnitude and frequency vary directly with the magnitude and frequency of the dynamic strain the fiber segment 116 experiences.

The signal processing device 118 is communicatively coupled to the interrogator 106 to receive the output signal. The signal processing device 118 includes a processor 102 and a non-transitory computer-readable medium 104 that are communicatively coupled to each other. An input device 110 and a display 108 interact with control module 250. The computer-readable medium 104 has stored on it program code to cause control module 250 to perform any suitable signal processing methods to the output signal. For example, if the fiber segment 116 is laid adjacent a region of interest that is simultaneously experiencing vibration at a rate under 20 Hz and acoustics at a rate over 20 Hz, the fiber segment 116 will experience similar strain and the output signal will comprise a superposition of signals representative of that vibration and those acoustics. Control module 250 may apply to the output signal a low pass filter with a cut-off frequency of 20 Hz, to isolate the vibration portion of the output signal from the acoustics portion of the output signal. Analogously, to isolate the acoustics portion of the output signal from the vibration portion, control module 250 may apply a high-pass filter with a cut-off frequency of 20 Hz. Control module 250 may also apply more complex signal processing methods to the output signal; example methods include those described in PCT application PCT/CA2012/000018 (publication number WO 2013/102252), the entirety of which is hereby incorporated by reference.

Figure 1B:
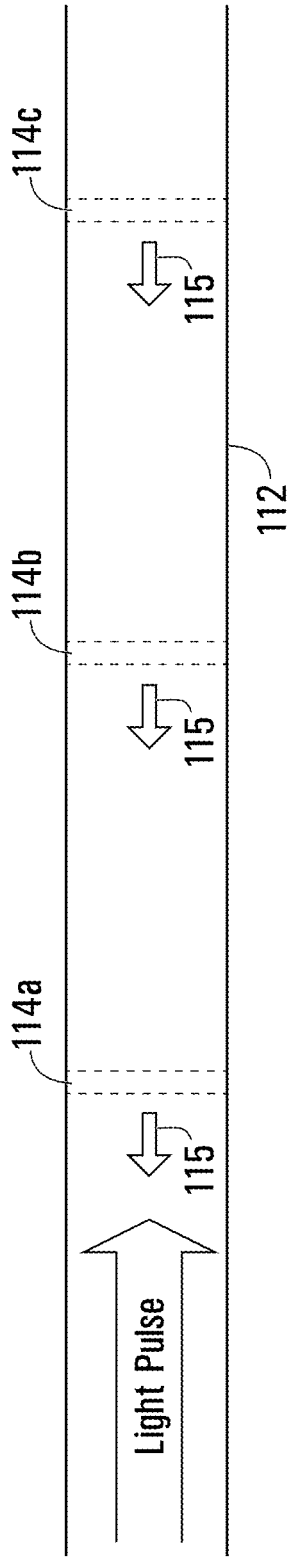
FIG. 1B is a schematic diagram that depicts how the FBGs reflect a light pulse, in accordance with embodiments of the disclosure.

FIG. 1B depicts how the FBGs 114 reflect the light pulse, according to another embodiment in which the optical fiber 112 comprises a third FBG 114c. In FIG. 1B, the second FBG 114b is equidistant from each of the first and third FBGs 114a,c when the fiber 112 is not strained. The light pulse is propagating along the fiber 112 and encounters three different FBGs 114, with each of the FBGs 114 reflecting a portion 115 of the pulse back towards the interrogator 106. In embodiments comprising three or more FBGs 114, the portions of the sensing and reference pulses not reflected by the first and second FBGs 114a,b can reflect off the third FBG 114c and any subsequent FBGs 114, resulting in interferometry that can be used to detect strain along the fiber 112 occurring further from the interrogator 106 than the second FBG 114b. For example, in the embodiment of FIG. 1B, a portion of the sensing pulse not reflected by the first and second FBGs 114a,b can reflect off the third FBG 114c, and a portion of the reference pulse not reflected by the first FBG 114a can reflect off the second FBG 114b, and these reflected pulses can interfere with each other at the interrogator 106.

Any changes to the optical path length of the fiber segment 116 result in a corresponding phase difference between the reflected reference and sensing pulses at the interrogator 106. Since the two reflected pulses are received as one combined interference pulse, the phase difference between them is embedded in the combined signal. This phase information can be extracted using proper signal processing techniques, such as phase demodulation. The relationship between the optical path of the fiber segment 116 and that phase difference (θ) is as follows:

$$\Theta = 2\pi n L/\lambda,$$

where n is the index of refraction of the optical fiber, L is the physical path length of the fiber segment 116, and λ is the wavelength of the optical pulses. A change in nL is caused by the fiber experiencing longitudinal strain induced by energy being transferred into the fiber. The source of this energy may be, for example, an object outside of the fiber experiencing dynamic strain, undergoing vibration, or emitting energy. As used herein, "dynamic strain" refers to strain that changes over time. Dynamic strain that has a frequency of between about 5 Hz and about 20 Hz is referred to by persons skilled in the art as "vibration", dynamic strain that has a frequency of greater than about 20 Hz is referred to by persons skilled in the art as "acoustics", and dynamic strain that changes at a rate of <1 Hz, such as at 500 μHz, is referred to as "sub-Hz strain".

Figure 1C:
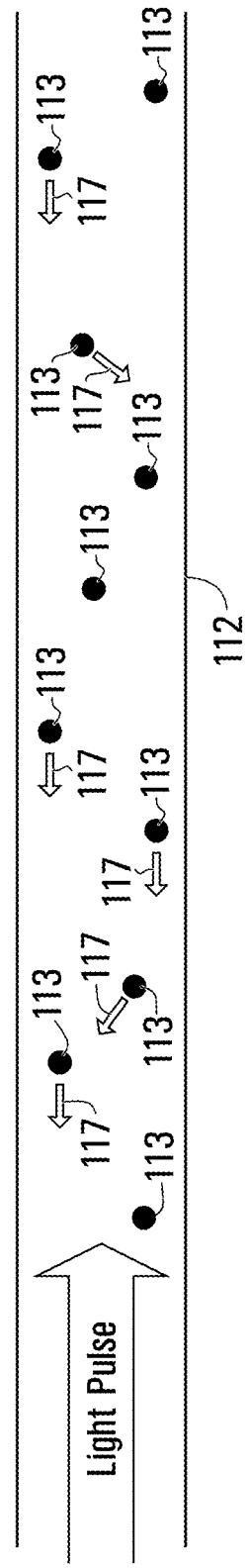
FIG. 1C is a schematic diagram that depicts how a light pulse interacts with impurities in an optical fiber that results in scattered laser light due to Rayleigh scattering, which is used for distributed acoustic sensing ("DAS"), in accordance with embodiments of the disclosure.

One conventional way of determining ΔnL is by using what is broadly referred to as distributed acoustic sensing ("DAS"). DAS involves laying the fiber 112 through or near a region of interest and then sending a coherent laser pulse along the fiber 112. As shown in FIG. 1C, the laser pulse interacts with impurities 113 in the fiber 112, which results in scattered laser light 117 because of Rayleigh scattering. Vibration or acoustics emanating from the region of interest results in a certain length of the fiber becoming strained, and the optical path change along that length varies directly with the magnitude of that strain. Some of the scattered laser light 117 is back-scattered along the fiber 112 and is directed towards the optical receiver 103, and depending on the amount of time required for the scattered light 117 to reach the receiver and the phase of the scattered light 117 as determined at the receiver, the location and magnitude of the vibration or acoustics can be estimated with respect to time. DAS relies on interferometry using the reflected light to estimate the strain the fiber experiences. The amount of light that is reflected is relatively low because it is a subset of the scattered light 117. Consequently, and as evidenced by comparing FIGS. 1B and 1C, Rayleigh scattering transmits less light back towards the optical receiver 103 than using the FBGs 114.

DAS accordingly uses Rayleigh scattering to estimate the magnitude, with respect to time, of the strain experienced by the fiber during an interrogation time window, which is a proxy for the magnitude of the vibration or acoustics emanating from the region of interest. In contrast, the embodiments described herein measure dynamic strain using interferometry resulting from laser light reflected by FBGs 114 that are added to the fiber 112 and that are designed to reflect significantly more of the light than is reflected as a result of Rayleigh scattering. This contrasts with an alternative use of FBGs 114 in which the center wavelengths of the FBGs 114 are monitored to detect any changes that may result to it in response to strain. In the depicted embodiments, groups of the FBGs 114 are located along the fiber 112. A typical FBG can have a reflectivity rating of between 0.1% and 5%. The use of FBG-based interferometry to measure dynamic strain offers several advantages over DAS, in terms of optical performance.

Generally, according to embodiments of the disclosure, there will now be described methods and systems for tracking an object, such as a PIG, moving along a conduit having multiple channels. Each channel defines a portion of a length of the conduit. The method includes, for each channel, obtaining acoustic data generated from one or more acoustic signals detected at the channel in response to movement of the object along the conduit. For example, as described above, one or more optical fiber may be interrogated using an optical fiber interrogator in order to generate the acoustic data. The interrogation system may rely on point reflectors (such as FBGs) or else may rely on DAS, as described above. According to some embodiments, other types of sensors may be used to obtain the acoustic data. For example, microphones, instead of optical fiber, may be used to obtain the acoustic data.

The method further includes, for each channel, cross-correlating the acoustic data with the acoustic data obtained for at least one other one of the channels. For example, for each channel, the acoustic data may be cross-correlated with the acoustic data obtained for each other one of the channels.

The method further includes determining, based on the cross-correlations, a position of the object within the conduit.

For instance, in order to determine the position of the object, a cross-correlation map (which may otherwise be referred to as an echo map) may be generated by mapping the cross-correlations as a function of the channels. Based on the cross-correlation map, the position of the object may be determined. Generating the cross-correlation map may include, for example, determining, for each cross-correlation, a lag of the cross-correlation. The cross-correlation map may be generated by further mapping the cross-correlations as a function of the determined lags.

Figure 2:
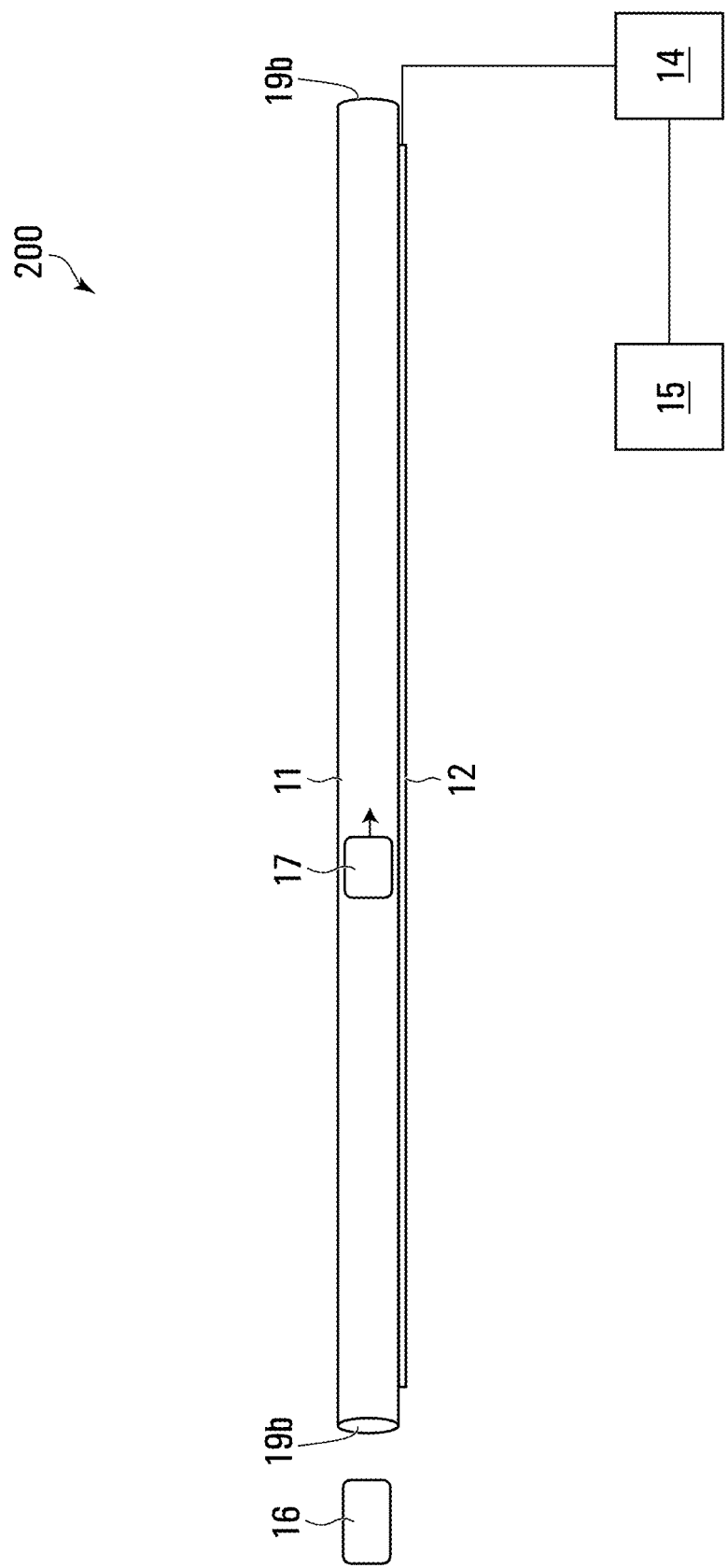
FIG. 2 is a schematic diagram of an optical interrogation system in accordance with embodiments of the disclosure.

Referring now to FIG. 2, there is shown an optical interrogation system 200 (similar to system 100) that may be used to track movement of a PIG in a pipeline, in accordance with embodiments of the disclosure. FIG. 2 shows a pipeline 11 alongside which is provided a length of optical fiber 12. For example, optical fiber 12 may be attached to pipeline 11. FBGs (not shown), as described above, are provided along the length of optical fiber 12 for reflecting light transmitted along optical fiber 12. In some embodiments, optical fiber 12 may comprise multiple individual interconnected lengths of optical fiber. Pipeline 11, or portions of pipeline 11, may be suspended above ground level by using one or more supports as known in the art. Alternatively, pipeline 11, or portions of pipeline 11, may be partially or wholly buried.

Optical fiber 12 is optically coupled to an interrogator 14. Interrogator 14 is configured to interrogate optical fiber 12 using optical fiber interferometry, as described above. Interrogator 14 is communicatively coupled to a control module 15. Control module 15 comprises one or more processors and one or more memories comprising computer program code executable by the one or more processors and configured, when executed by the one or more processors, to cause the one or more processors to process phase data obtained by interrogator 14 from interferences between light pulses transmitted along optical fiber 12. In some embodiments, control module 15 may be comprised within interrogator 14 such that interrogator 14 may perform the functions of control module 15.

Optical fiber 12 is divided into a number of channels or portions of optical fiber. In order to distinguish between different channels, interrogator 14 may employ techniques known in the art such as time division multiplexing (TDM) or wavelength division multiplexing (WDM), or a combination of both, as described above. For instance, in the context of WDM, different pulses having different wavelengths may be transmitted along optical fiber 12. Each channel of optical fiber 12 may be provided with FBGs configured to reflect light having a certain wavelength. Depending on the wavelength of the reflections received from optical fiber 12, interrogator 14 may determine from which channel the reflections originated from.

At one end of pipeline 11 is provided a PIG launcher 16. PIG launcher 16 is operable to launch one or more PIGs into pipeline 11, whereupon the PIGs are moved along the length pipeline 11 by the flow of fluid within pipeline 11. As can be seen in FIG. 2, a PIG 17 is moving from a first end 19a of pipeline 11 to a second end 19b of pipeline 11.

As will now be described in further detail, control module 15, interrogator 14, and optical fiber 12 may be used to generate and analyze acoustic data (typically in the range of about 100 Hz to about 40 kHz) from pipeline 11 as PIG 17 moves along pipeline 11. The data may be processed to track PIG 17 as PIG 17 moves along pipeline 11, by determining or otherwise estimating a position of PIG 17 as a function of time elapsed since the launch of PIG 17. Such data may be used, for example, to determine when PIG 17 is likely to exit pipeline 11 via end 19b, or else may be used to determine a likely position of PIG 17 within pipeline 11 in the event that PIG 17 becomes stuck within pipeline 11.

Figure 3:
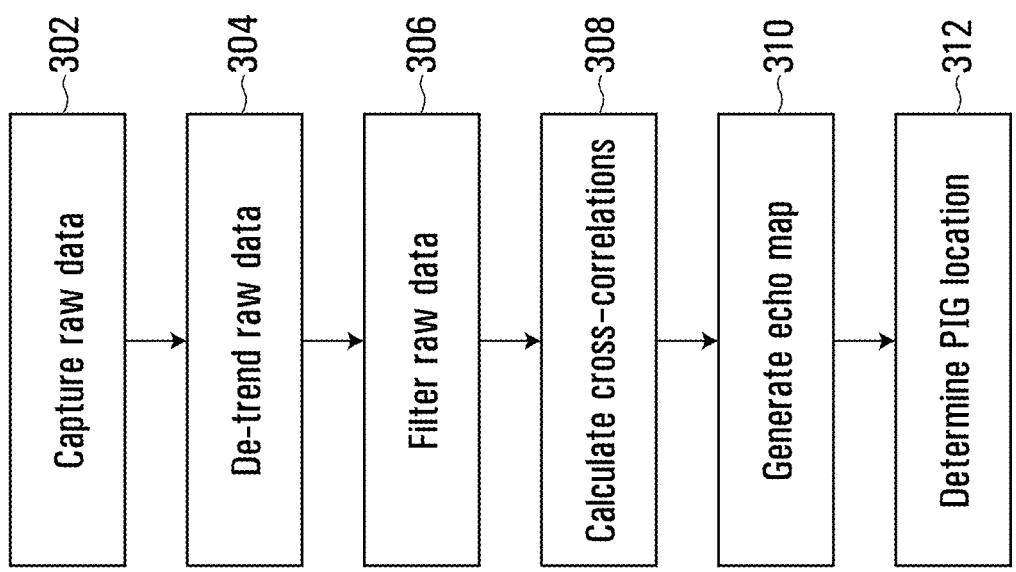
FIG. 3 is a flow diagram of a method of tracking a PIG moving along a pipeline, in accordance with embodiments of the disclosure.

Turning to FIG. 3, there is shown an example general method of tracking PIG 17 as PIG 17 moves through pipeline 11, according to an embodiment of the disclosure. As PIG 17 moves through pipeline 11, acoustic signals will propagate along pipeline 11 in both directions, as a result of the interaction of PIG 17 with, for example, the walls of pipeline 11 and the flow of fluid within pipeline 11. The acoustic signals may be amplified when, for example, PIG 17 moves past a pipe joint at the intersection of two interconnecting sections of pipe. These acoustic signals that propagate up and down pipeline 11 may be detected by interrogator 14 using optical fiber interferometry, as described above.

At block 302, interrogator 14 captures raw data by interrogating optical fiber 12 by transmitting light pulses along optical fiber 12, and detecting reflections of the light pulses from the FBGs positioned along optical fiber 12. Differences in phase between the transmitted and reflected pulses may be due to the result of acoustic signals interfering with the transmitted and reflected pulses. The raw data may be based on phase data relating to the interferences between the transmitted and reflected pulses. Generally, the raw data includes both raw acoustic data and raw strain data, and the raw acoustic data comprises data in the frequency range of from about 0 to about 100 kHz. The raw acoustic data may be sampled by control module 15 at a relatively high sampling rate, although for PIG-tracking purposes a sampling rate of for example 8 kHz or lower is sufficient. The raw acoustic data may optionally and subsequently be downsampled.

At block 304, control module 15 de-trends the raw acoustic data. De-trending the raw acoustic data may comprise removing low frequency components (such as frequencies below 10 Hz) which may relate to strain instead of acoustics.

At block 306, control module 15 filters the raw acoustic data that was de-trended at block 304. For example, the data may be passed through a high-pass filter to remove further unwanted low frequencies from the data that may not relate to acoustics.

At block 308, for each channel of pipeline 11, control module 15 calculates the cross-correlation of the acoustic data obtained for that channel with the acoustic data obtained for each other channel of pipeline 11. For example, the RMS (or some other parameter relating to magnitude) of the acoustic data obtained for that channel may be cross-correlated with the acoustic data obtained for each other channel of pipeline 11.

Based on the cross-correlations calculated at block 308, at block 310, control module 15 generates an echo map for each channel. Each echo map comprises a mapping of the cross-correlations as a function of the channels as well as a function of the lags of the cross-correlations.

At block 312, based on the echo maps, control module 15 is able to determine a position of PIG 17 within pipeline 11. By performing multiple iterations of the process shown in FIG. 3, control module 15 is furthermore able to track a position of PIG 17 over time, as PIG 17 moves through pipeline 11.

The general process shown in FIG. 3 will now be described in further detail.

Figure 4:
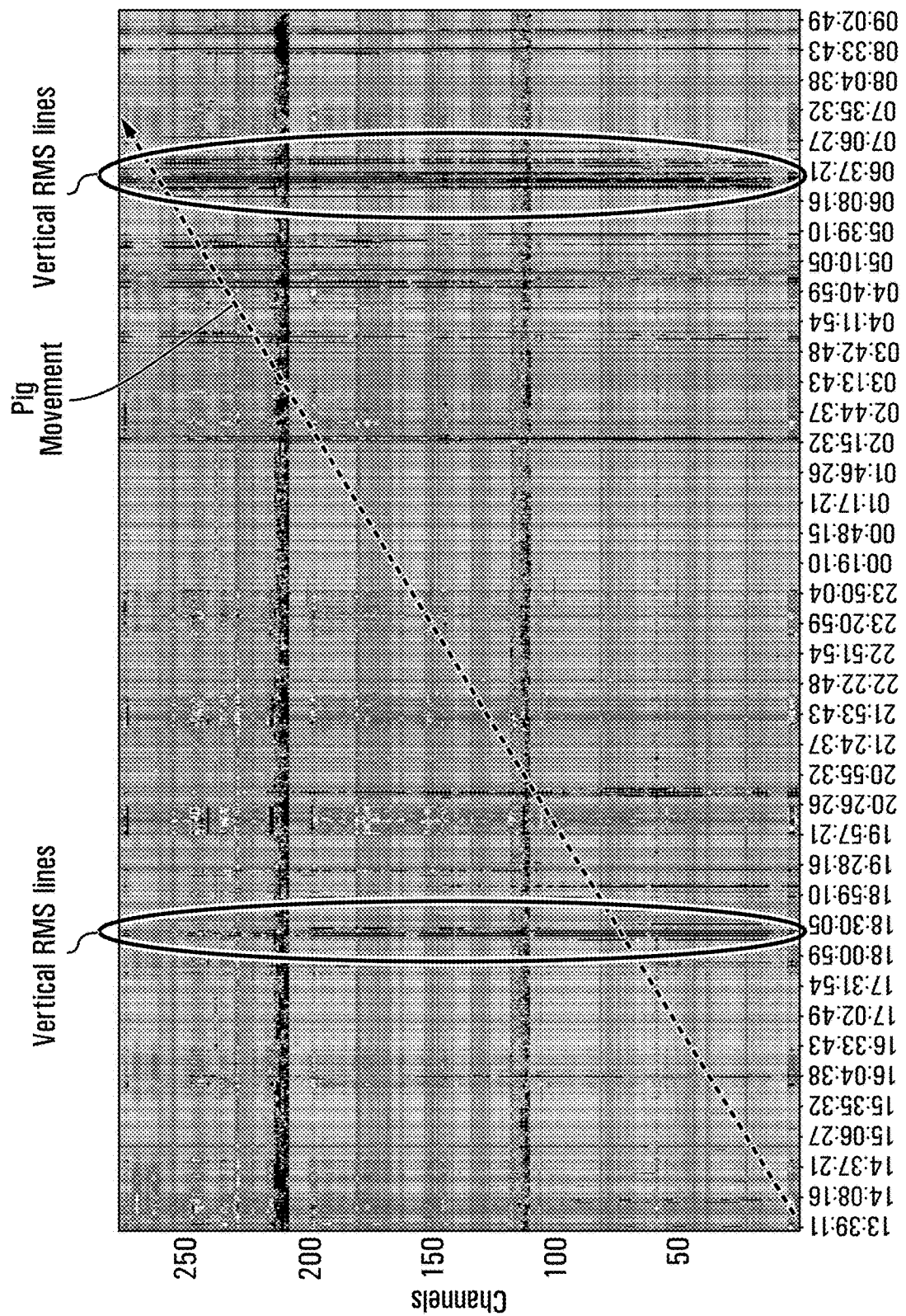
FIG. 4 is a plot of RMS acoustic data as a function of time and channel, according to an embodiment of the disclosure.

Turning to FIG. 4, there is shown an example plot of the root-mean-square (RMS) of acoustic data obtained during the passing of a PIG through a pipeline. The RMS acoustic data is displayed as a function of the channel along the pipeline (the y-axis) and time (along the x-axis). The roughly vertical lines correspond to acoustic signals travelling up and down the pipeline, with the PIG as the source of the acoustic signals. Although these lines appear to be generally vertical, in actual fact the lines are angled slightly with a positive slope, thereby indicating the speed of the acoustic signals along the pipeline. The horizontal lines correspond to noise originating from static sources such as pumps.

Figure 5:
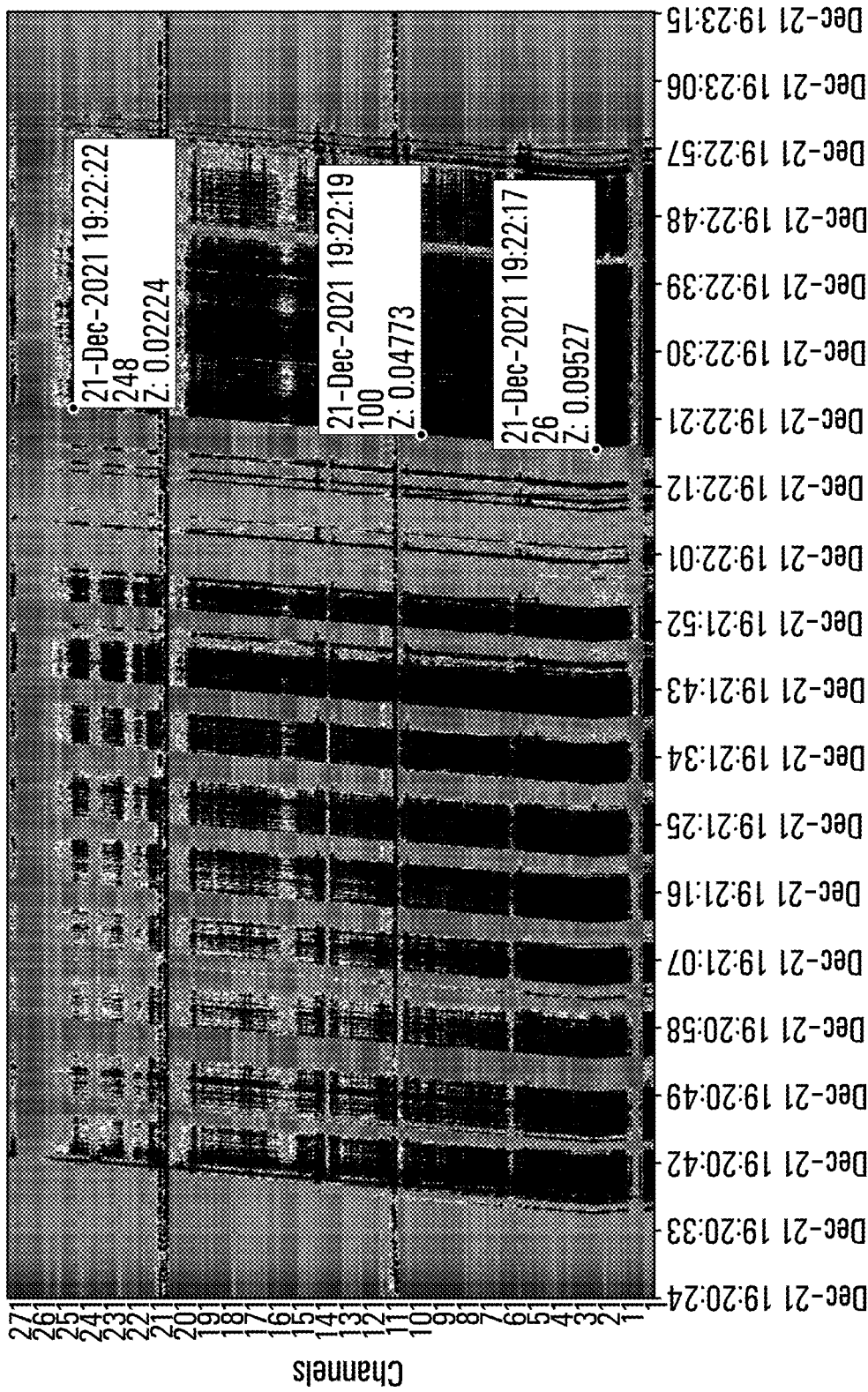
FIG. 5 is a plot of RMS acoustic data as a function of time and channel, according to another embodiment of the disclosure.

The positive slope of the RMS acoustic data can be more clearly seen in FIG. 5 which shows about 3 minutes of data instead of 19 hours of data. The vertical lines are generated every time the PIG passes a weld joint or other similar abnormality in the wall of the pipe. The gaps between vertical lines correspond to the PIG travelling along a pipe section between two adjacent weld joints or other similar abnormalities.

As described above, as part of the PIG tracking method described herein, the RMS acoustic data for each channel is cross-correlated with the RMS acoustic data generated for each other channel. Cross-correlation may be performed by applying the following function to the acoustic data generated for pairs of channels:

$$R_{xy}(m) = E\{x_n y^*_{n-m}\}$$

where $-\infty < n < \infty$, the asterisk denotes complex conjugation, and E is the expected value operator.

Ideally, the time window over which the cross-correlation is performed should be at least as long as the time taken for the acoustic signal to travel from the first channel in the pair of channels to the second channel in the pair of channels. This window is therefore a function of the speed of sound within the pipeline. Given the typical speed of sound in a pipeline and the distance coverage of fiber optic sensors, a 30-second window is generally sufficient.

Figure 6:
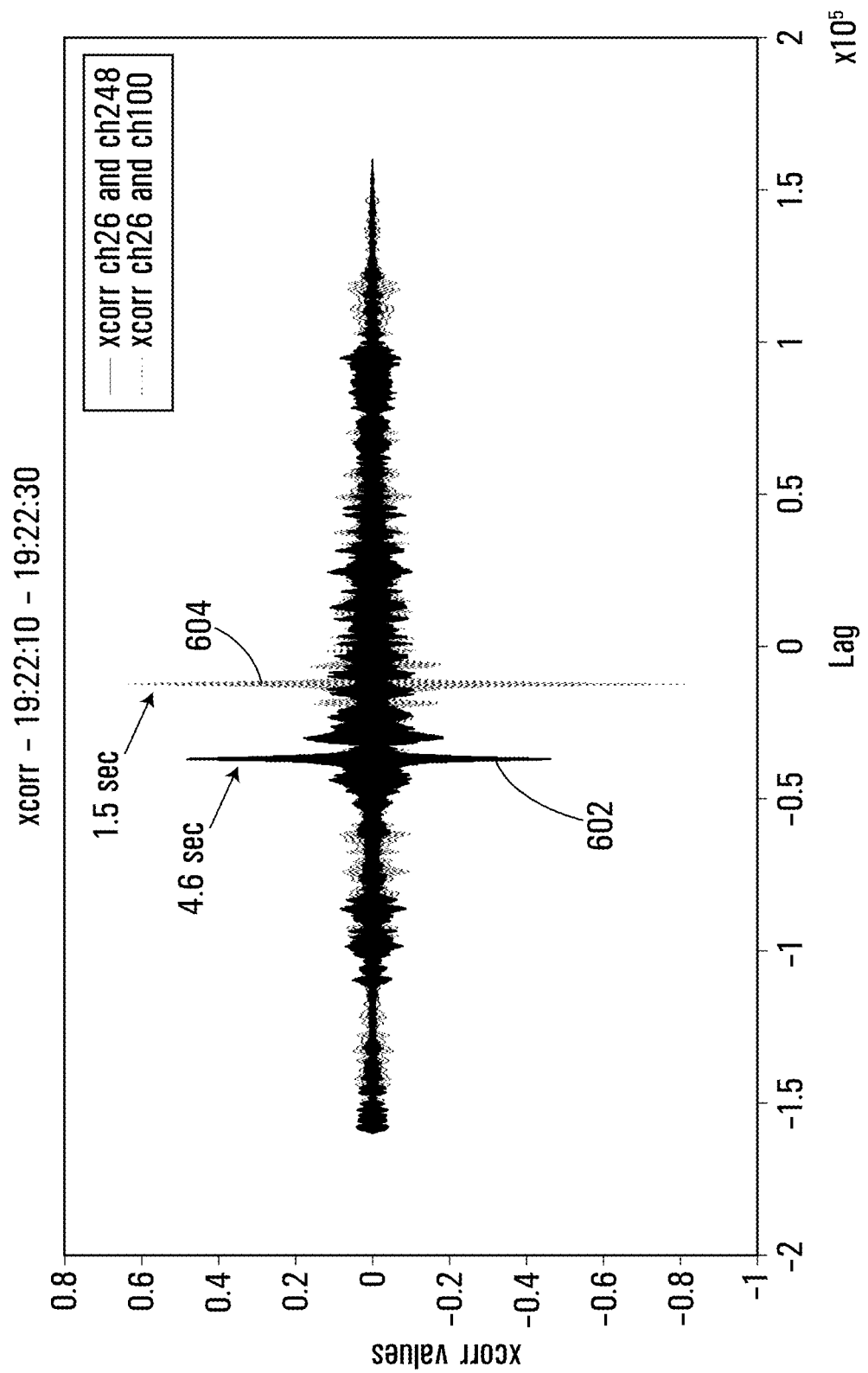
FIG. 6 is a plot of cross-correlations of acoustic data for different channels, according to an embodiment of the disclosure.

Turning to FIG. 6, there is shown an example of a first cross-correlation 602 of RMS acoustic data from a first channel (channel 26) with RMS acoustic data from a second channel (channel 248). FIG. 6 additionally shows an example of a second cross-correlation 604 of RMS acoustic data from the first channel (channel 26) with RMS acoustic data from a third channel (channel 100). Each cross-correlation is associated with a lag which may be a measure of the time it takes the sounds emitted from the PIG to travel from one channel in the pair to the other channel in the pair. As can be seen, the maximum value of cross-correlation 604 is larger than that of cross-correlation 602, since the PIG is at channel 26 and therefore is closer to channel 100 than to channel 248. Both the relative lags of the cross-correlations, and the relative strengths of the cross-correlations, may provide useful parameters for validating that the cross-correlations have been accurately calculated. For example, in the case of FIG. 6, one would expect the strength of cross-correlation 604 to be greater than that of cross-correlation 602, and for the lag of cross-correlation 602 to be greater than that of cross-correlation 604.

Figure 7:
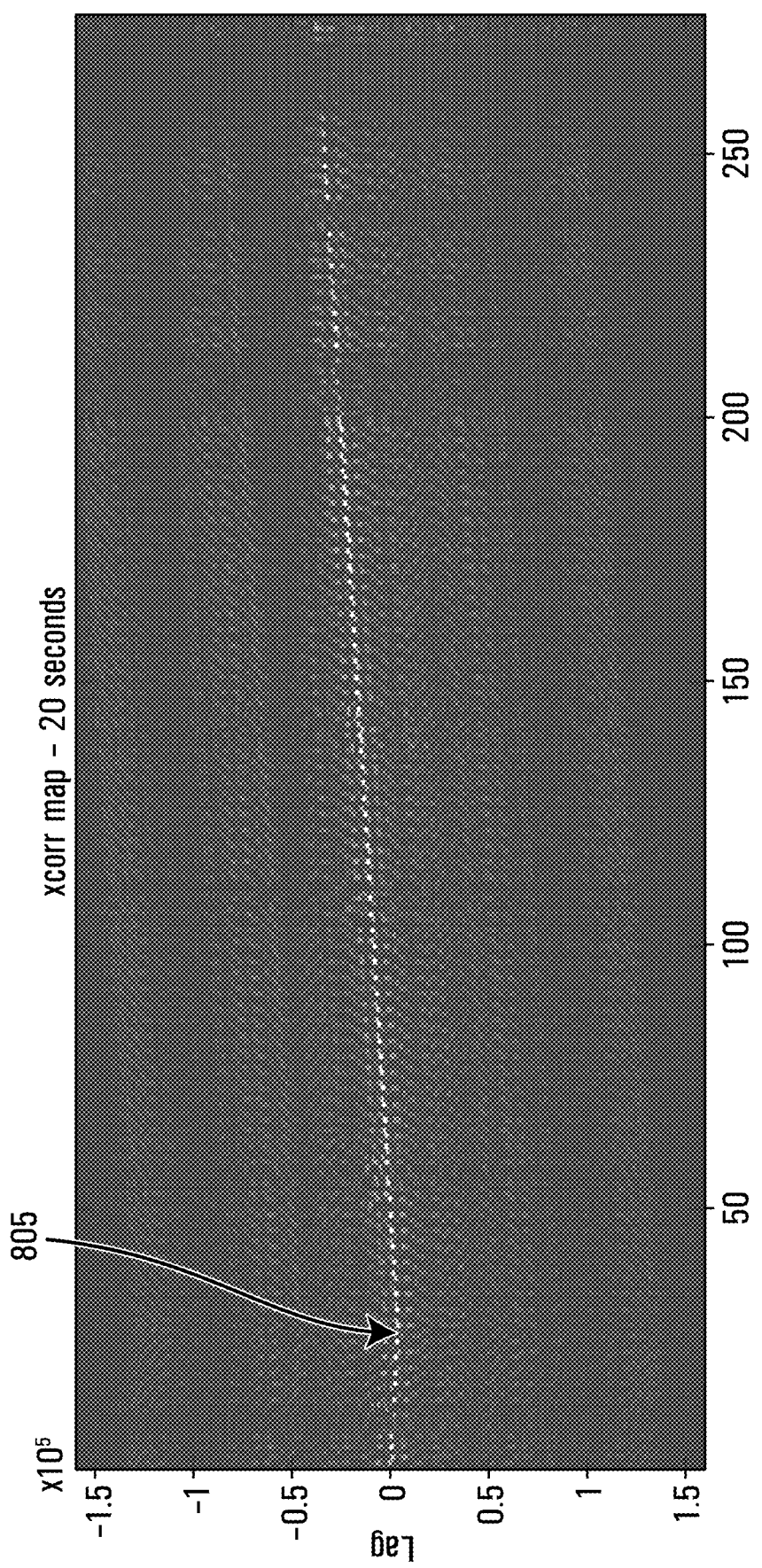
FIG. 7 is a plot of cross-correlations of acoustic data as a function of lag and channel, according to an embodiment of the disclosure.

After having calculated, for a given channel, the cross-correlation of the RMS acoustic data generated for that channel with the RMS acoustic data generated for each other channel, the determined cross-correlations may be plotted in what may be referred to as a cross-correlation map or an echo map. An example of an echo map is shown in FIG. 7, which plots the cross-correlations between RMS acoustic data for a given channel and each other channel. The echo map shows the cross-correlations as a function channel number (x-axis) and the lag of the cross-correlation (y-axis). The strength of each cross-correlations is indicated by the intensity of the data points in the x-y plane. In other words, the echo map in FIG. 7 may be thought of as depicting multiple cross-sections of multiple cross-correlations as depicted for example in FIG. 6.

As can be seen in FIG. 7, the cross-correlations generally define two straight lines that intersect at an apex 805. The slopes of the two lines are similar, but in opposite directions. This is due to the fact that the sounds generated by the movement of the PIG travel at a nearly constant speed (the speed of sound in the materials the pipe is made of, for instance steel). However, the direction of travel of these sounds on either side of the PIG is different, leading to their opposite slopes. Therefore, the channel corresponding to apex 805 indicates the current location of the PIG.

While a single echo map may be sufficient to enable the location of the PIG of the determined, multiple echo maps may be generated in order to increase the accuracy of location estimation, or to provide added comfort in the initial estimate. For example, an echo map may be generated for each of multiple channels (for instance, a channel at one end of the pipeline, a channel in the middle of the pipeline, and a channel at the other end of the pipeline). According to some embodiments, an echo map may be generated for every single channel of the pipeline.

Figure 8:
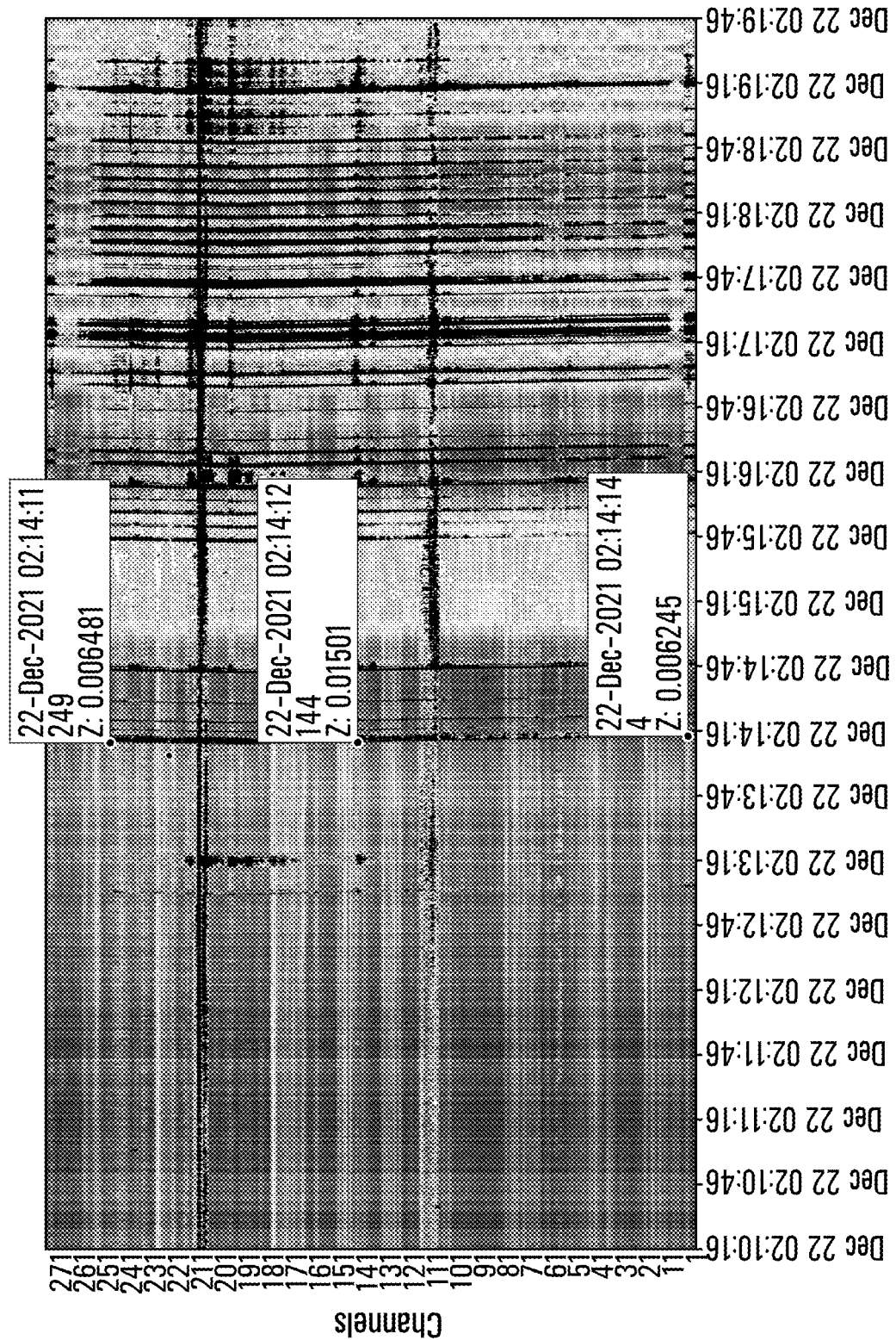
FIG. 8 is a plot of RMS acoustic data as a function of time and channel, according to another embodiment of the disclosure.
Figure 9:
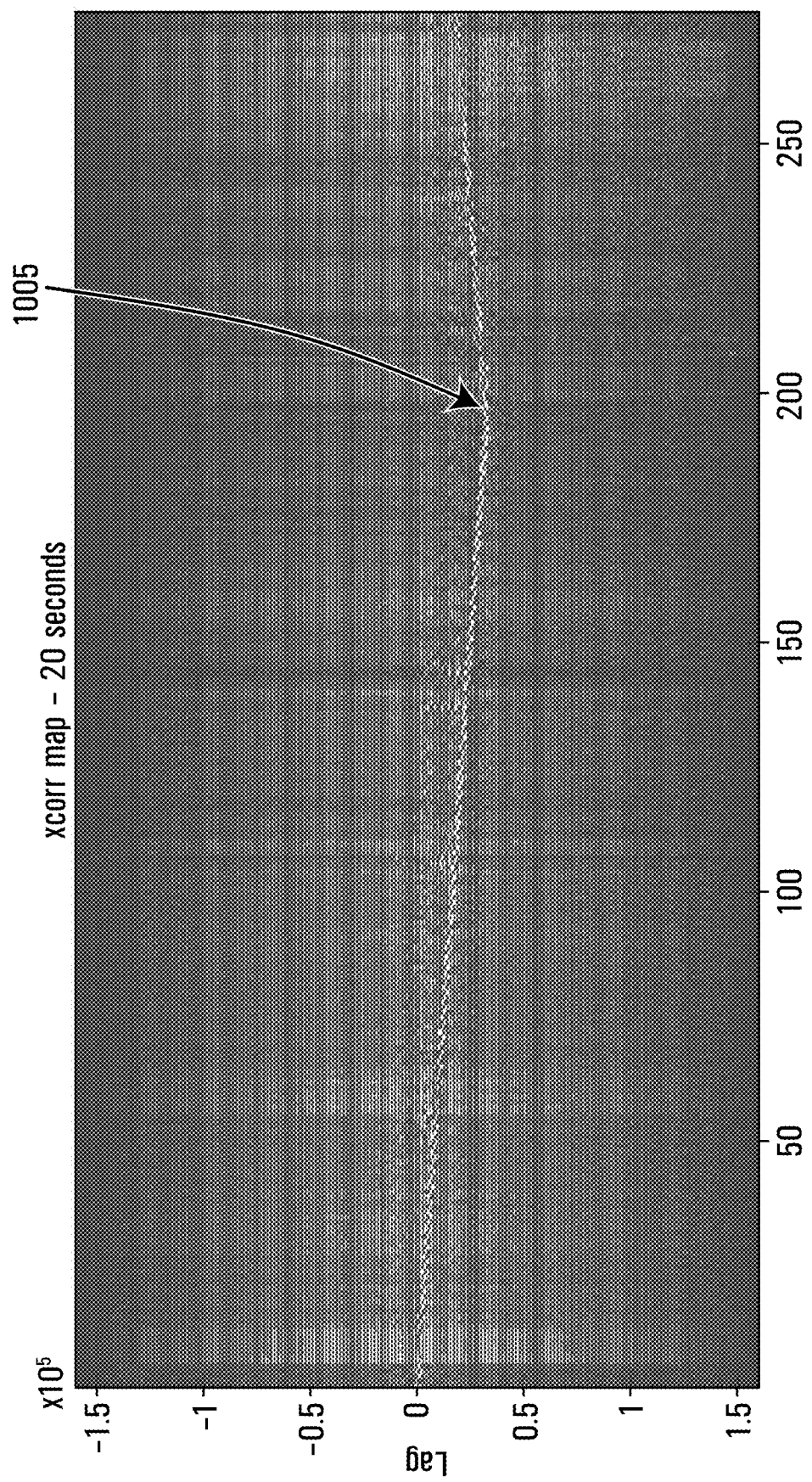
FIG. 9 is a plot of cross-correlations of acoustic data as a function of lag and channel, according to another embodiment of the disclosure.

FIGS. 8 and 9 illustrate another example of a plot (FIG. 8) of the RMS of acoustic data generated during movement of a PIG through a pipeline, and the corresponding echo map (FIG. 9) that is generated by calculating, for a given channel, the cross-correlation of the RMS acoustic data for that channel with the RMS acoustic data for each other channel. Like the echo map of FIG. 7, the echo map of FIG. 9 contains an apex 1005 whose associated channel indicates the current position of the PIG.

By iterating the process (for example, every 20 seconds) described above so as to repeatedly generate echo maps at different points in time during the travel of the PIG through the pipeline, the position of the PIG may be tracked over time by mapping the various channels associated with the apex points of the echo maps over time. This may enable, for example, a speed profile to be generated for the PIG. PIGs generally do not travel at high speeds, and therefore it is possible to iterate the method at reasonably spaced time intervals so as not to place too much of a computational burden on the control module or other processor performing the calculations.

Figure 10:
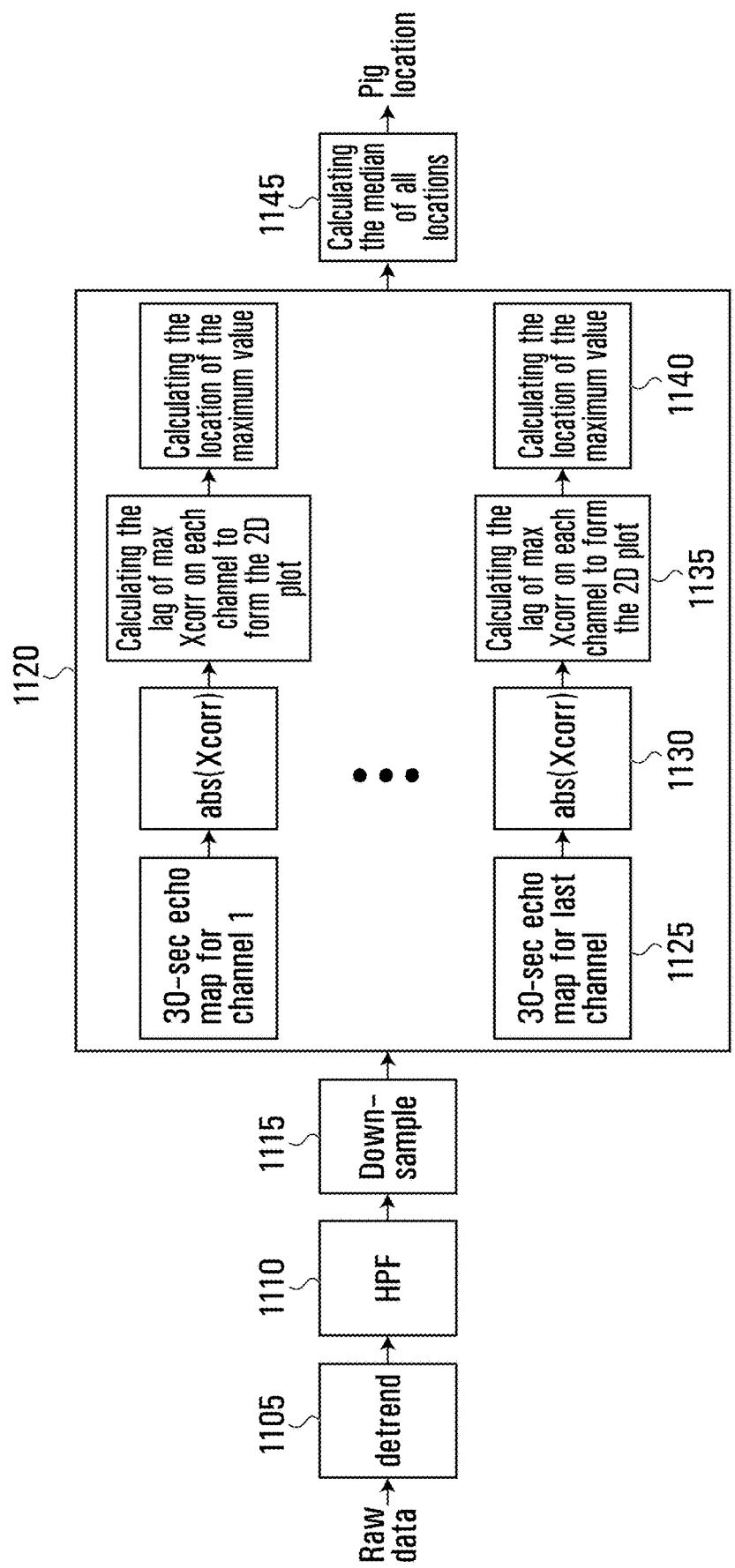
FIG. 10 is a flow diagram of a method of tracking a PIG moving along a pipeline, in accordance with embodiments of the disclosure.

Turning to FIG. 10, there is shown another flow diagram illustrating a method of tracking a PIG moving along a pipeline, according to another embodiment of the disclosure.

At block 1105, raw acoustic data is obtained from the pipeline. For example, as described above, optical fiber positioned alongside the pipeline may be interrogated to obtain the raw acoustic data.

At block 1110, the raw acoustic data is passed through a high-pass filter. The high-pass filter may filter out unwanted low-frequency data that may not relate to acoustics. A typical high-pass filter may filter out frequencies below 10 Hz.

At block 1115, the output of the high-pass filter is passed to a downsampler that downsamples the data to a range that can be processed by the computer without much computational overhead. Data may be downsampled to 500 Hz and still retain enough fidelity for cross-correlation processing.

At block 1120, the output of the downsampler is processed as per the operations of blocks 1125, 1130, 1135, and 1140, described in further detail below. The operations of blocks 1125, 1130, 1135, and 1140 are performed on the downsampled data associated with each respective channel of the pipeline.

Figure 11:
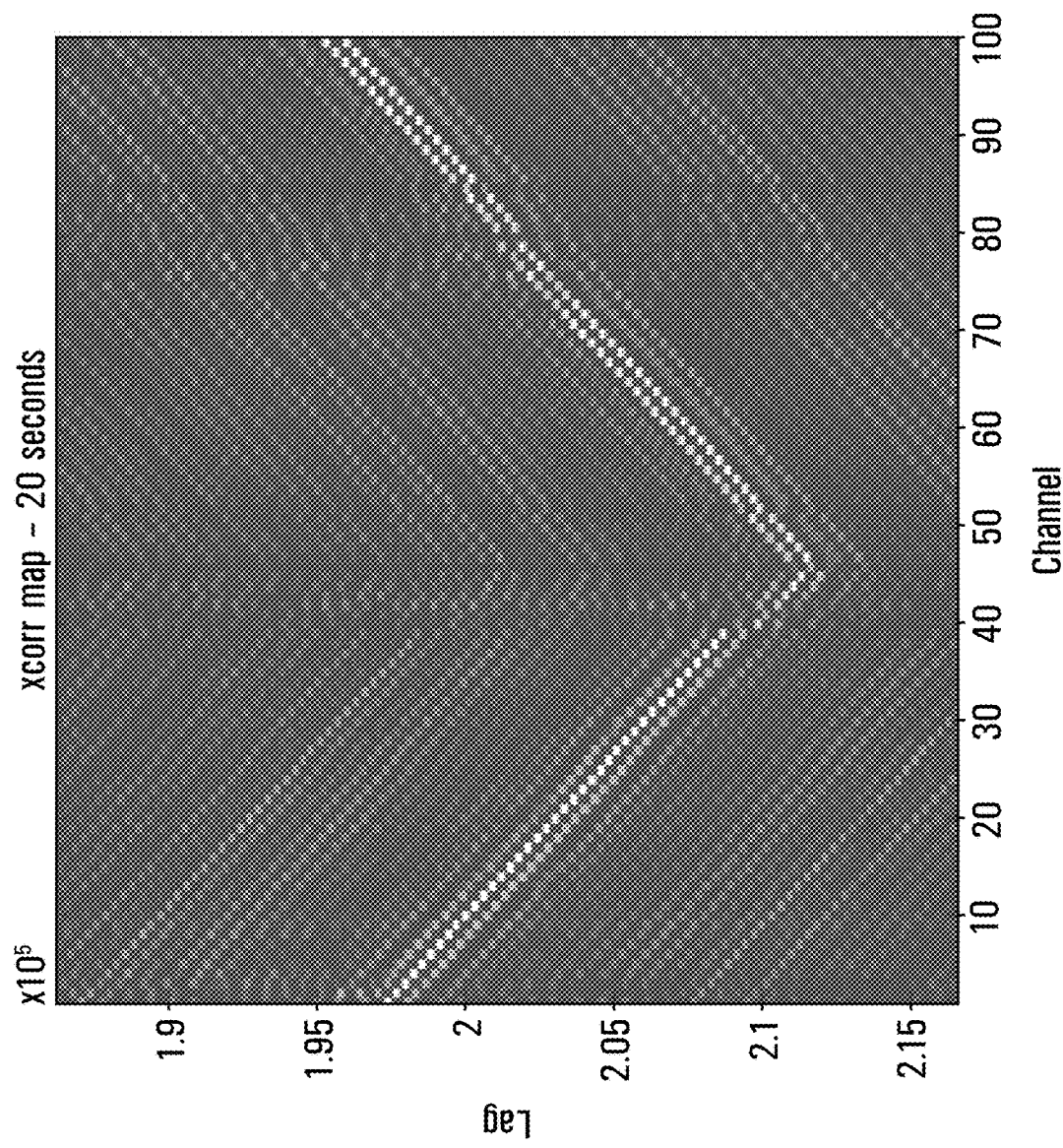
FIG. 11 is a plot of cross-correlations of acoustic data as a function of lag and channel (and which may be referred to as an "echo map" or a "cross-correlation map"), according to another embodiment of the disclosure.

In particular, at block 1125, an echo map is generated for each channel. The echo map is generated, for example, as described above in connection with FIG. 7. In particular, for a given channel, the echo map is generated by determining the cross-correlation of the RMS acoustic data generated for that channel with the RMS acoustic data generated for each other channel. The cross-correlations are then plotted as a function of channel number (x-axis) and the lags of the cross-correlations (y-axis). An example of 30 seconds' worth of cross-correlation data used to generate an echo map is shown in FIG. 11.

Figure 12:
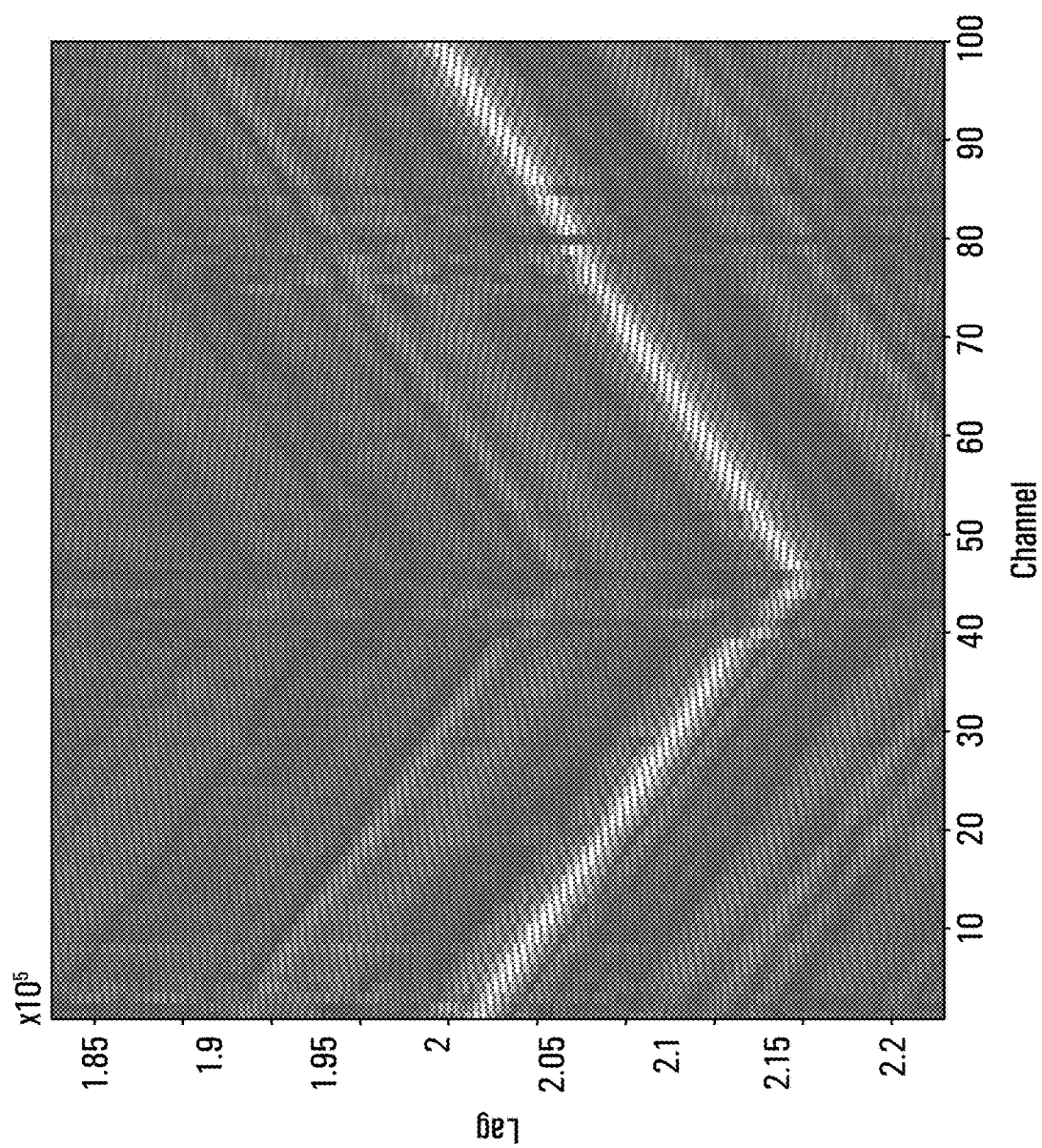
FIG. 12 is a plot of the absolute value of the cross-correlations shown in FIG. 11.

At block 1130, the absolute values of the cross-correlations in each echo map are calculated, which may produce adjusted echo maps as shown for example in FIG. 12.

Figure 13:
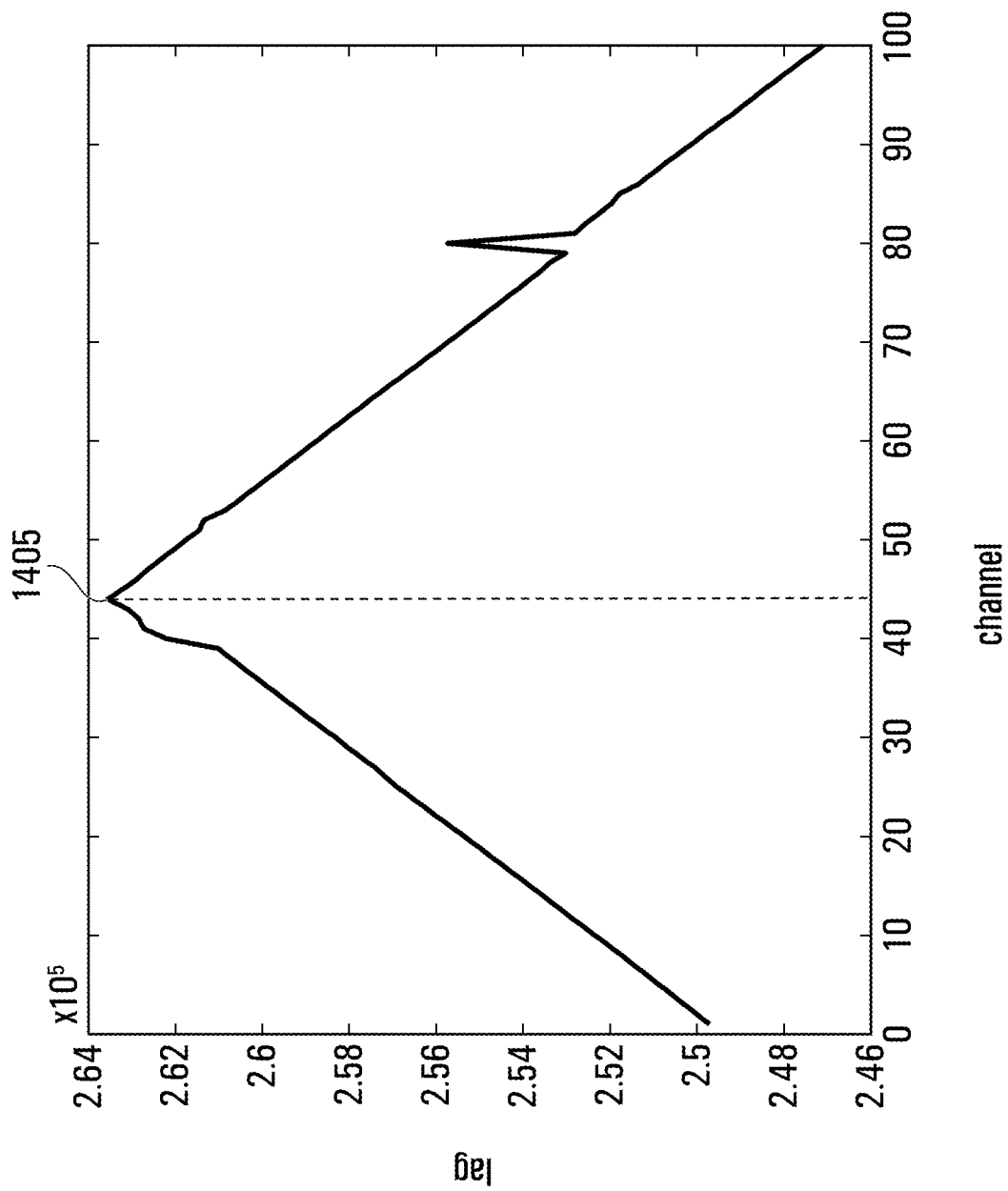
FIG. 13 is a plot of lag as a function of channel, based on the maximum cross-correlation obtained for a given echo map, according to an embodiment of the disclosure.

At block 1135, for each echo map, the lag as a function of channel is calculated based on the maximum absolute value of the cross-correlation strength obtained in the echo map. An example of such a plot is shown in FIG. 13. Thus, FIG. 13 is a two-dimensional plot obtained from an echo map wherein the cross-correlation variable is fixed at its maximum absolute value in the echo map. As can be seen, the two-dimensional lag vs. channel plot generally includes two straight lines that intersect at an apex 1405. One such two-dimensional lag vs. channel is generated for each echo map. The difference in the y-intercepts for FIGS. 12 and 13 is due to the fact that the respective plots are based on different echo maps.

At block 1140, the channel corresponding to the apex in each two-dimensional lag vs. channel plot is calculated.

Figure 14:
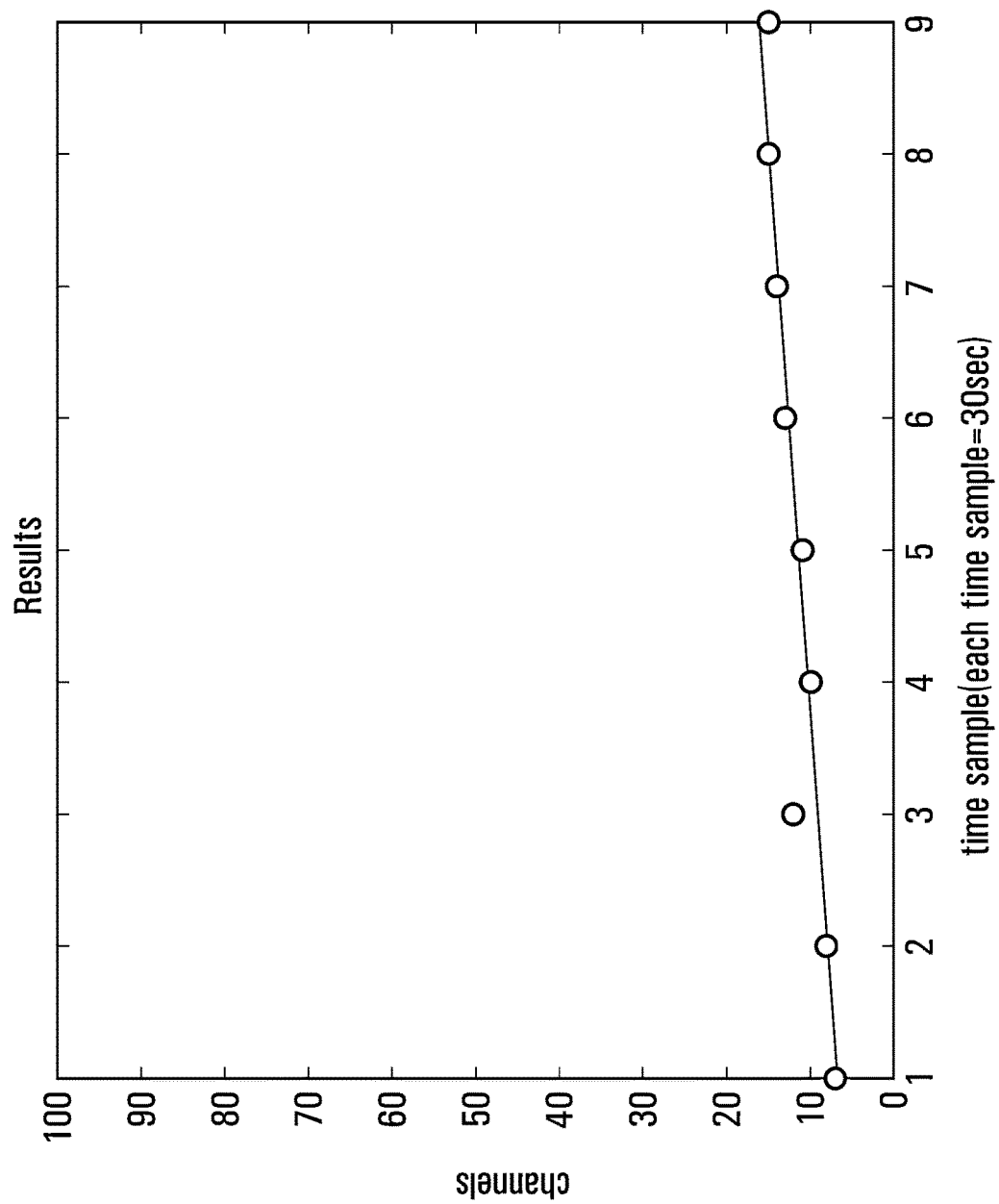
FIG. 14 is a plot of the position of a PIG as a result of multiple iterations of a PIG tracking method, according to an embodiment of the disclosure.

As indicated in FIG. 10, the output of block 1120 is passed to block 1145, whereat the median or some other average of the channel numbers obtained at block 1140 may be calculated. By repeating the process shown in FIG. 10 multiple times, the position of the PIG over time can be tracked. For example, as can be seen in FIG. 14, there is shown the position of the PIG over time, with the velocity of the PIG indicated roughly by the slope of the line.

Each "two-dimensional lag vs. channel plot" (FIG. 13) is calculated over a certain time window (e.g. 30 seconds long). Each dot in FIG. 14 corresponds to the PIG's location, as determined from FIG. 13, and therefore each dot corresponds to a ~30 second window (or whatever duration the window is set to).

Figure 15:
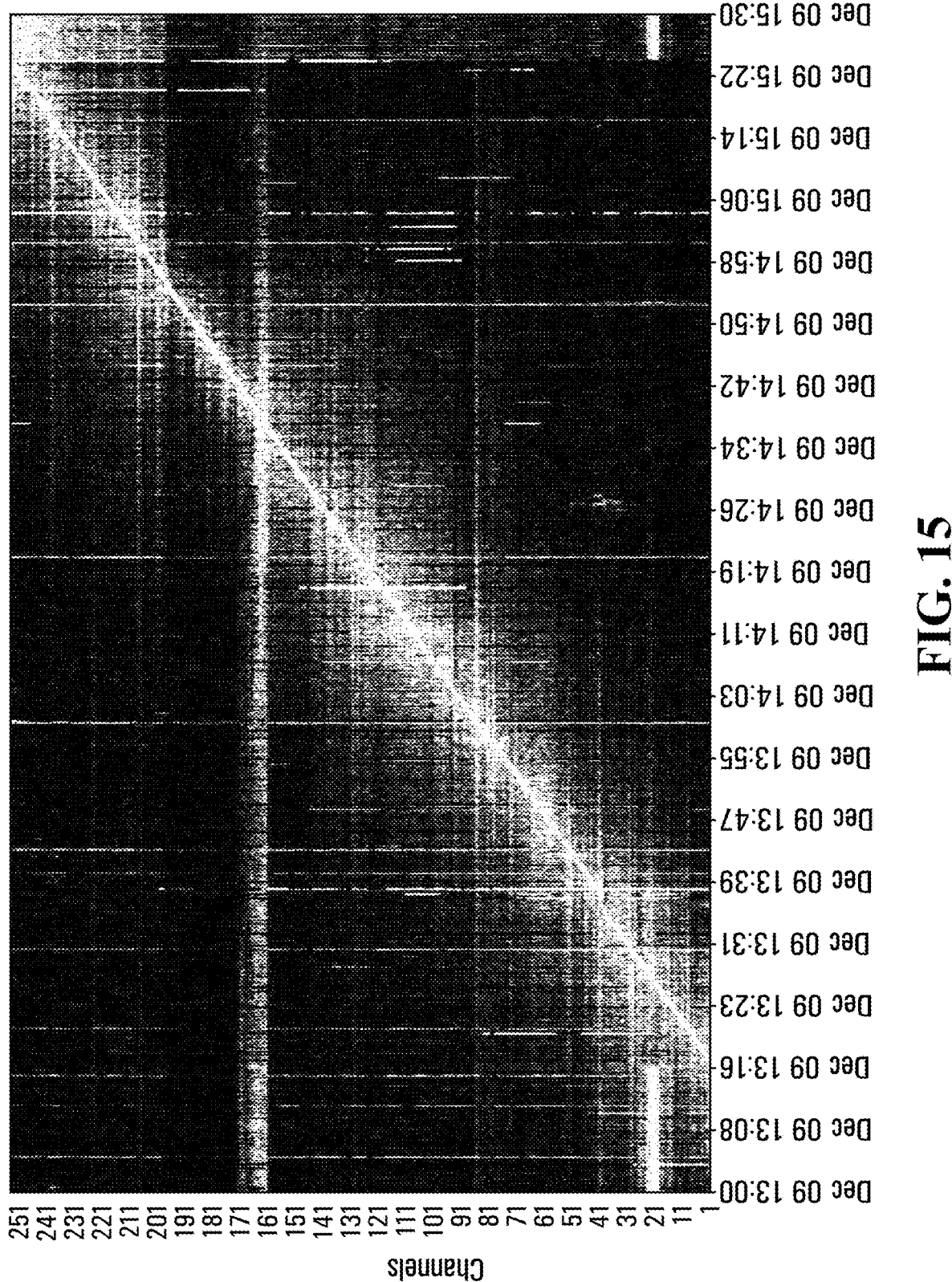
FIGS. 15 and 16 are plots of RMS acoustic data as a function of time, recorded during a pipeline PIG run.
Figure 16:
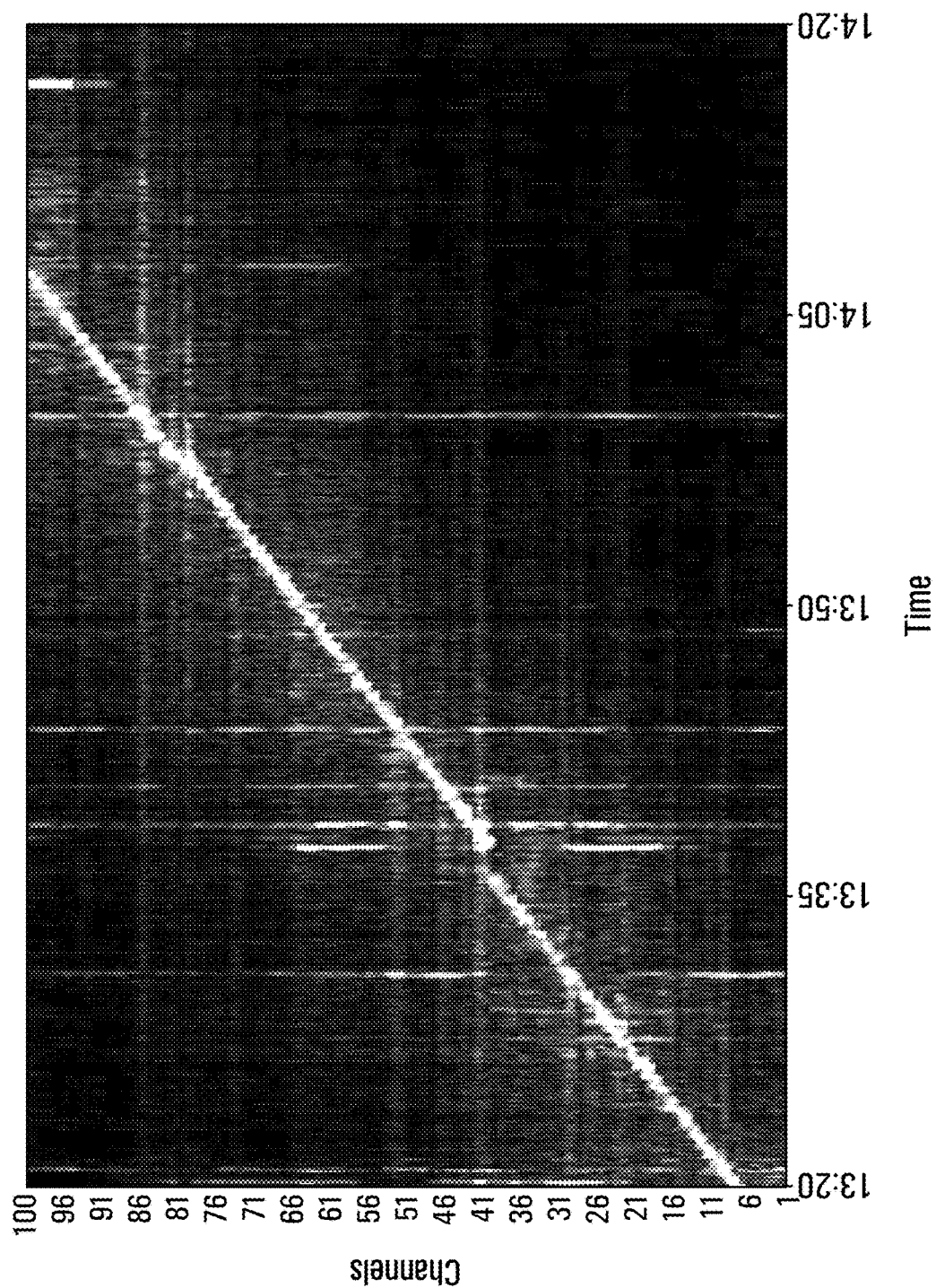
Figure 17:
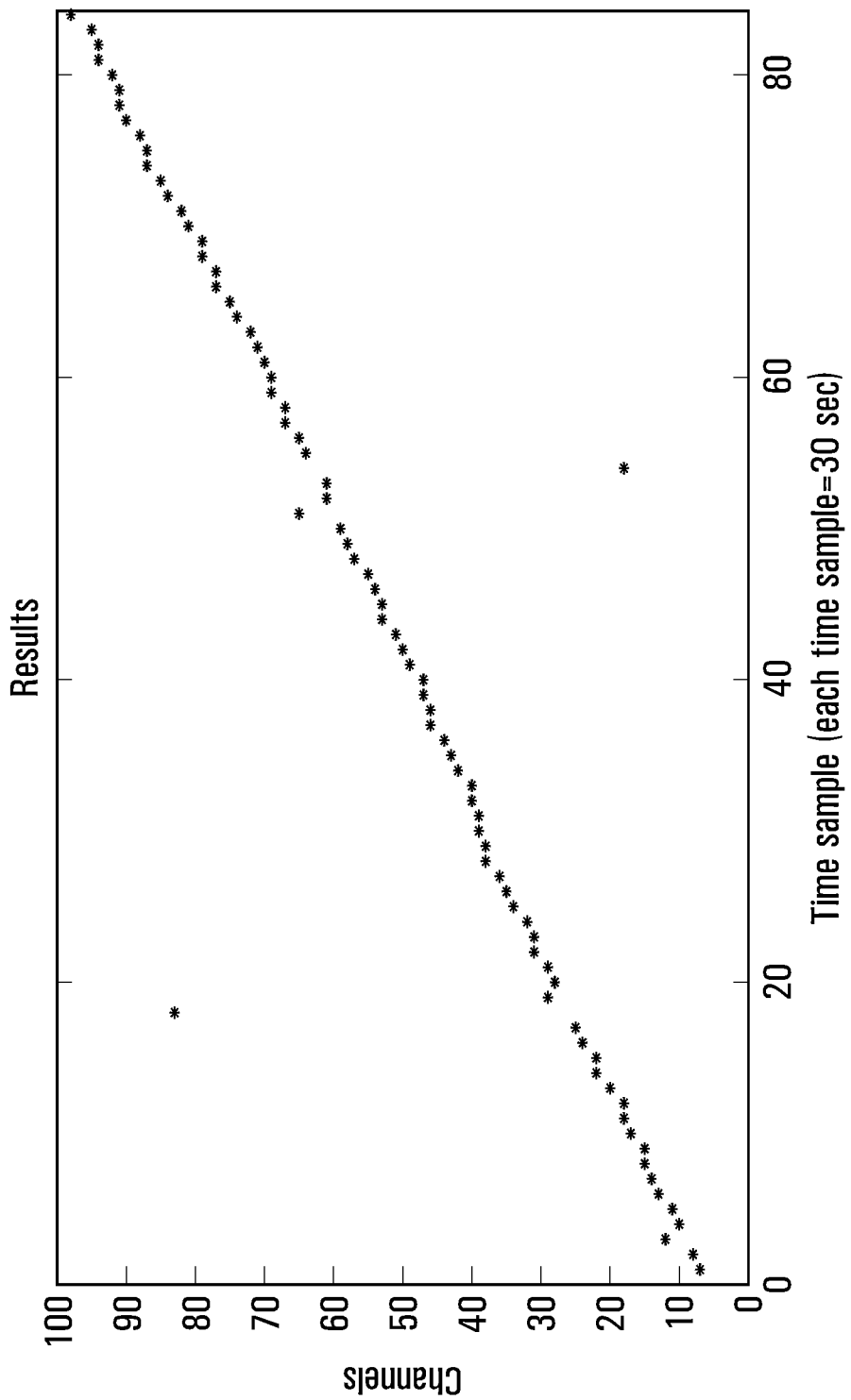
FIG. 17 is a plot of the position of a PIG as a result of multiple iterations of a PIG tracking method, according to another embodiment of the disclosure.

FIGS. 15 and 16 illustrate the acoustic data recorded during some example PIG runs. The vertical lines generated by the movement of the PIG through pipe weld joints are visible. FIG. 17, like FIG. 14, shows the PIG's location over time as calculated from the process explained above.

It should be noted that, while the disclosure has generally been presented in the context of tracking a PIG moving through a pipeline, the disclosure is not limited to this application, and the methods described herein may be more generally applied to the tracking of any moving object through any conduit. Generally speaking, the present disclosure relates to a method of tracking object movement based on acoustic signals generated as a result of the movement of the object.

Furthermore, while the disclosure has been described in the context of optical fiber, other types of sensors may be used. For example, a microphone or any other suitable acoustic sensor may be used to detect acoustic signals from the fluid conduit.

The embodiments have been described above with reference to flowcharts and block diagrams of methods, apparatuses, systems, and computer program products. In this regard, the flowcharts and block diagrams in the figures illustrate the architecture, functionality, and operation of possible implementations of various embodiments. For instance, each block of the flowcharts and block diagrams may represent a module, segment, or portion of code, which comprises one or more executable instructions for implementing the specified logical function(s). In some alternative embodiments, the functions noted in that block may occur out of the order noted in those figures. For example, two blocks shown in succession may, in some embodiments, be executed substantially concurrently, or the blocks may sometimes be executed in the reverse order, depending upon the functionality involved. Some specific examples of the foregoing have been noted above but those noted examples are not necessarily the only examples. Each block of the block diagrams and flowcharts, and combinations of those blocks, may be implemented by special purpose hardware-based systems that perform the specified functions or acts, or combinations of special purpose hardware and computer instructions.

Each block of the flowcharts and block diagrams and combinations thereof can be implemented by computer program instructions. These computer program instructions may be provided to a processor of a general-purpose computer, special-purpose computer, or other programmable data processing apparatus to produce a machine, such that the instructions, which execute via the processor of the computer or other programmable data-processing apparatus, create means for implementing the functions or acts specified in the blocks of the flowcharts and block diagrams.

These computer program instructions may also be stored in a computer-readable medium that can direct a computer, other programmable data-processing apparatus, or other devices to function in a particular manner, such that the instructions stored in the computer-readable medium produce an article of manufacture including instructions that implement the function or act specified in the blocks of the flowcharts and block diagrams. The computer program instructions may also be loaded onto a computer, other programmable data-processing apparatus, or other devices to cause a series of operational steps to be performed on the computer, other programmable apparatus or other devices to produce a computer-implemented process such that the instructions that execute on the computer or other programmable apparatus provide processes for implementing the functions or acts specified in the blocks of the flowcharts and block diagrams.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context. The term "and/or" herein when used in association with a list of items means any one or more of the items comprising that list.

As used herein, a reference to "about" or "approximately" a number or to being "substantially" equal to a number means being within +/−10% of that number.

While the disclosure has been described in connection with specific embodiments, it is to be understood that the disclosure is not limited to these embodiments, and that alterations, modifications, and variations of these embodiments may be carried out by the skilled person without departing from the scope of the disclosure. It is furthermore contemplated that any part of any aspect or embodiment discussed in this specification can be implemented or combined with any part of any other aspect or embodiment discussed in this specification.

The invention claimed is:

1. A method of tracking an object moving along a conduit having multiple channels, each channel defining a portion of a length of the conduit, the method comprising:
for each channel:
obtaining acoustic data generated from one or more acoustic signals detected at the channel in response to movement of the object along the conduit;
for at least one channel:
cross-correlating the acoustic data obtained for the at least one channel with the acoustic data obtained for at least one other one of the channels;
generating a cross-correlation map by mapping each cross-correlation as a function of the channels:
identifying in the cross-correlation map an apex formed by an intersection of lines defined by the mapped cross-correlations;
determining a channel associated with the apex; and
determining, based on the apex, a position of the object within the conduit.

2. The method of claim 1, wherein:
the cross-correlating comprises:
for each channel:
cross-correlating the acoustic data obtained for the channel with the acoustic data obtained for each other one of the channels; and
the determining comprises:
determining, based on each cross-correlation, the position of the object within the conduit.

3. The method of claim 1, wherein obtaining the acoustic data comprises:
detecting the one or more acoustic signals using one or more sensors; and
generating the acoustic data from the one or more detected acoustic signals.

4. The method of claim 3, wherein detecting the one or more acoustic signals comprises:
optically interrogating one or more lengths of optical fiber positioned alongside the conduit.

5. The method of claim 4, wherein the one or more lengths of optical fiber comprise one or more fiber Bragg grating for reflecting light transmitted along the one or more lengths of optical fiber.

6. The method of claim 1, wherein generating the cross-correlation map comprises:
for each cross-correlation:
determining a lag of the cross-correlation; and generating the cross-correlation map by further mapping each cross-correlation as a function of each determined lag.

7. The method of claim 6, wherein determining the position of the object further comprises:
for each cross-correlation in the cross-correlation map:
determining an absolute value of the cross-correlation;
determining a maximum cross-correlation based on each absolute value of each cross-correlation; and
determining the position of the object based on the maximum cross-correlation.

8. The method of claim 7, wherein determining the position of the object further comprises:
determining a channel associated with the maximum cross-correlation; and
determining the position of the object based on the channel associated with the maximum cross-correlation.

9. The method of claim 1, wherein the acoustic data comprises data in a frequency range of from 0 to 100 kHz.

10. The method of claim 1, wherein obtaining the acoustic data comprises:
obtaining raw acoustic data generated from the one or more acoustic signals detected at the channel in response to movement of the object along the conduit; and
down-sampling the raw acoustic data so as to obtain the acoustic data.

11. The method of claim 1, wherein the object is a pipeline inspection gauge.

12. The method of claim 1, wherein cross-correlating the acoustic data obtained for the at least one channel with the acoustic data obtained for the at least one other one of the channels comprises performing the cross-correlation over a time window, and wherein the time window is at least as long as an amount of time taken for the one or more acoustic signals to travel from the at least one channel to the at least one other one of the channels.

13. A system comprising:
a conduit having multiple channels, each channel defining a portion of a length of the conduit;
one or more sensors positioned to monitor the conduit; and
one or more controllers configured to:
for each channel:
operate the one or more sensors so as to detect one or more acoustic signals at the channel in response to movement of the object along the conduit;
generate acoustic data from the one or more detected acoustic signals; and
for at least one channel:
cross-correlate the acoustic data obtained for the at least one channel with the acoustic data obtained for at least one other one of the channels;
generate a cross-correlation map by mapping each cross-correlation as a function of the channels;
identify in the cross-correlation map an apex formed by an intersection of lines defined by the mapped cross-correlations;
determine a channel associated with the apex; and
determine, based on the apex, a position of the object within the conduit.

14. The system of claim 13, wherein:
the one or more sensors comprise one or more lengths of optical fiber positioned alongside the conduit;
the system further comprises an optical fiber interrogator optically coupled to the one or more lengths of optical fiber; and
the one or more controllers are further configured to control the optical fiber interrogator so as to interrogate the one or more lengths of optical fiber.

15. A computer-readable medium having stored thereon computer program code configured, when executed by one or more processors, to cause the one or more processors to perform a method comprising:
for each channel of a conduit, each channel defining a portion of a length of the conduit:
receiving acoustic data generated from one or more acoustic signals detected at the channel in response to movement of an object along the conduit; and
for at least one channel:
cross-correlating the acoustic data received for the at least one channel with the acoustic data received for at least one other one of the channels;
generating a cross-correlation map by mapping each cross-correlation as a function of the channels;
identifying in the cross-correlation map an apex formed by an intersection of lines defined by the mapped cross-correlations;
determining a channel associated with the apex; and
determining, based on the apex, a position of the object within the conduit.

* * * * *